United States Patent
Bajekal (10) Patent No.: US 11,952,121 B2
(45) Date of Patent: Apr. 9, 2024

(54) SENSOR SYSTEMS AND METHODS FOR AN AIRCRAFT LAVATORY

(71) Applicant: B/E Aerospace, Inc., Winston Salem, NC (US)

(72) Inventor: Sanjay Bajekal, Simsbury, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 386 days.

(21) Appl. No.: 17/350,965

(22) Filed: Jun. 17, 2021

(65) Prior Publication Data

US 2022/0402610 A1 Dec. 22, 2022

(51) Int. Cl.
*B64D 11/02* (2006.01)
*G06F 18/2134* (2023.01)
*H04L 67/125* (2022.01)

(52) U.S. Cl.
CPC ........ *B64D 11/02* (2013.01); *G06F 18/21342* (2023.01); *H04L 67/125* (2013.01)

(58) Field of Classification Search
CPC .. B64D 11/02; G06F 18/21342; H04L 67/125
USPC ....................................................... 340/573.1
See application file for complete search history.

(56) References Cited

U.S. PATENT DOCUMENTS

| 5,025,516 A * | 6/1991 | Wilson .................... E03C 1/057 250/221 |
| 6,215,399 B1 * | 4/2001 | Shpater ................ G08B 13/193 340/567 |
| 10,136,773 B2 * | 11/2018 | Tsuiki ..................... E03D 5/105 |
| 10,924,889 B1 | 2/2021 | Omer |
| 2011/0273546 A1 * | 11/2011 | Lin ........................ G06F 1/3231 348/E5.04 |
| 2015/0090865 A1 * | 4/2015 | Calatayud ............... G06F 3/162 250/208.4 |
| 2016/0274232 A1 * | 9/2016 | Schiffmann ............. G01S 7/415 |
| 2017/0299727 A1 * | 10/2017 | Irish ........................ G01S 19/42 |
| 2019/0259270 A1 * | 8/2019 | Amini .................. H04N 19/156 |

OTHER PUBLICATIONS

European Patent Office, European Search Report dated Nov. 11, 2022 in Application No. 22178946.4.
Hadj Henni Abderraouf et al: "Enhanced Multiples Binary PIR Localization Using the Transferable Belief Model", IEEE Sensors Journal, IEEE, vol. 19, No. 18, USA, dated Sep. 15, 2019. 14 pages.
Griffiths Erin, et al: "An Empirical Design Space Analysis of Doorway Tracking Systems for Real-World Environments", ACM Transactions on Sensor Networks, ACM, New York, dated Sep. 8, 2017. 34 pages.
Qi Hao, et al: "Multiple Human Tracking and Identification with Wireless Distributed Pyroelectric Sensors Systems", IEEE Systems Journal, IEEE, US, dated Dec. 1, 2009. 12 pages.

* cited by examiner

*Primary Examiner* — Kerri L McNally
(74) *Attorney, Agent, or Firm* — SNELL & WILMER L.L.P.

(57) ABSTRACT

A method may comprise receiving, via a processor, a first indication that an object is in a first zone of interest of a first sensor in the plurality of sensors; receiving, via the processor, a second indication that the object is in a second zone of interest of a second sensor in the plurality of sensors; and determining, via the processor, whether the first sensor or the second sensor is falsely detecting the object within the respective zone of interest.

19 Claims, 5 Drawing Sheets

SENSOR SYSTEMS AND METHODS FOR AN AIRCRAFT LAVATORY

FIELD

The present disclosure relates generally to improved sensor systems and methods and, more particularly, to improved sensor systems and methods for an aircraft lavatory.

BACKGROUND

There are at least six surfaces in a typical lavatory of an aircraft that typically are activated using a manual switch (e.g., a faucet, a soap dispenser, a waste flap, a toilet flush, a toilet seat, and a toilet). Typical lavatory systems have manually activated switches for activation. The recent novel-coronavirus (SARS-COV-2) outbreak has negatively impacted the safety and health of many people. Pathogens can be transmitted via direct airborne transmission between users or via indirect contact transmission from different users occupying the same space at different times. For example, lingering pathogens may remain on contact surfaces of an aircraft cabin to be spread to passengers and/or crew members on the same or subsequent flight. The safety of passengers and crew members may be improved by implementing touchless features in aircraft cabins, such as gesture based systems and methods. However, multiple sensors in a small area, such as a lavatory of an aircraft may lead to false detection and/or sub-optimal use of limited resources on-board the aircraft.

SUMMARY

A method of determining whether an object is in an intended zone of influence is disclosed herein. The method may comprise: receiving, via a processor and through a first sensor, a first indication that the object is within a first zone of interest; receiving, via the processor and through a second sensor, a second indication that the object is within a second zone of interest; determining a first null hypothesis corresponding to the object being outside a first intended zone of interest of the first sensor; determining a second null hypothesis corresponding to the object being outsize a second intended zone of interest of the second sensor; determining a first alternative hypothesis corresponding to the object being inside the first intended zone of interest; determining a second alternative hypothesis corresponding to the object being inside the second intended zone of interest; calculating, via the processor, a posterior probability and a posterior density over the first zone of interest and the second zone of interest; and determining, via the processor, whether the object is within the first intended zone of interest or the second intended zone of interest.

In various embodiments, the method may further comprise commanding, via the processor, an electrically activated device associated with the first sensor in response to determining the object is within the first intended zone of interest. The first null hypothesis corresponds to a first probability model and the second null hypothesis corresponds to a second probability model. The first probability model and the second probability model are given by $P(H_0|y_0)$, wherein $H_0$ is a null hypothesis and y is a measured pixel intensity from a respective sensor. The first alternative hypothesis corresponds to a third probability model and the second alternative hypothesis corresponds to a fourth probability model. The first alternative hypothesis and the second alternative hypothesis are given by $f(x_{0|y_0})$, wherein x is a parametrized state. The first sensor and the second sensor may be presence sensors. The first sensor and the second sensor may be infrared sensors.

A false detection system for a multi-sensor system is disclosed herein. The false detection system may comprise: a plurality of sensors, each sensor including a zone of interest; a main controller in operable communication with the plurality of sensors the main controller configured to: receive, via a processor, a first indication that an object is in a first zone of interest of a first sensor in the plurality of sensors; receive, via the processor, a second indication that the object is in a second zone of interest of a second sensor in the plurality of sensors; and determine, via the processor, whether the first sensor or the second sensor is falsely detecting the object within the respective zone of interest.

In various embodiments, the main controller is further configured to determine whether the first sensor or the second sensor is within an intended zone of interest of the respective sensor. The main controller may be further configured to send, via the processor and through a local controller, a signal to an electrically activated device corresponding to the first sensor in response to determining the first sensor is within the intended zone of interest. The main controller may be further configured to determine whether the first sensor or the second sensor is falsely detecting the object within the respective zone of interest further comprises determining a null hypothesis that the object is within a respective intended zone of interest and determining an alternative hypothesis that the object is outside the respective intended zone of interest. The first sensor and the second sensor may be configured for detection of non-linear and non-Gaussian motion. The first sensor and the second sensor may be presence sensors.

An aircraft lavatory is disclosed herein. The aircraft lavatory may comprise: a first sensor; a second sensor; a first electrically activated device; a second electrically activated device; a first local controller in operable communication with the first sensor and the first electrically activated device; a second local controller in operable communication with the second sensor and the second electrically activated device; and a main controller in operable communication with the first local controller and the second local controller, the main controller configured to determine whether an object is intended to activate the first electrically activated device or the second electrically activated device in response to the object being disposed in overlapping ranges of the first sensor and the second sensor.

In various embodiments, the main controller is further configured to command, through the first local controller, the first electrically activated device to operate in response to determining the object is intended for to operate the first electrically activated device. The first electrically activated device may be a valve of a faucet system. The first electrically activated device may be an actuator of a toilet seat system. The first electrically activated device may be a pump of a soap dispensing system. The aircraft lavatory may further comprise a faucet system including the first sensor, the first electrically activated device, and the first local controller.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Typical methods for fusing multiple sensor inputs to make a multi-input decision include some form of a Kalman filter (i.e., an algorithm that uses a series of measurements observed over time, containing statistical noise and other inaccuracies, and produces estimates of unknown variables that tend to be more accurate than those based on a single measurement alone). The basis of Kalman filtering assumes a linear, Gaussian sensor and motion. However, Kalman filtering may be difficult to utilize in a lavatory environment. In particular, sensors disclosed herein may include mixed modalities for the sensors (e.g., passive and active infrared, electric fields, etc.) and passengers of lavatories in aircraft typically have non-Gaussian motion models.

In various embodiments, false detection systems and methods for a multi-sensor system is disclosed herein. The false detection systems and methods may combine multi-modal sensor measurements and determine a probability of that a sensor in the multi-sensor system is an intended sensor to be activated. In various embodiments, the false detection systems and methods combine a plurality of sensor models and motion models and sequentially estimate a probability of a target sensor over a respective area of influence, as described further herein.

Figure 1:
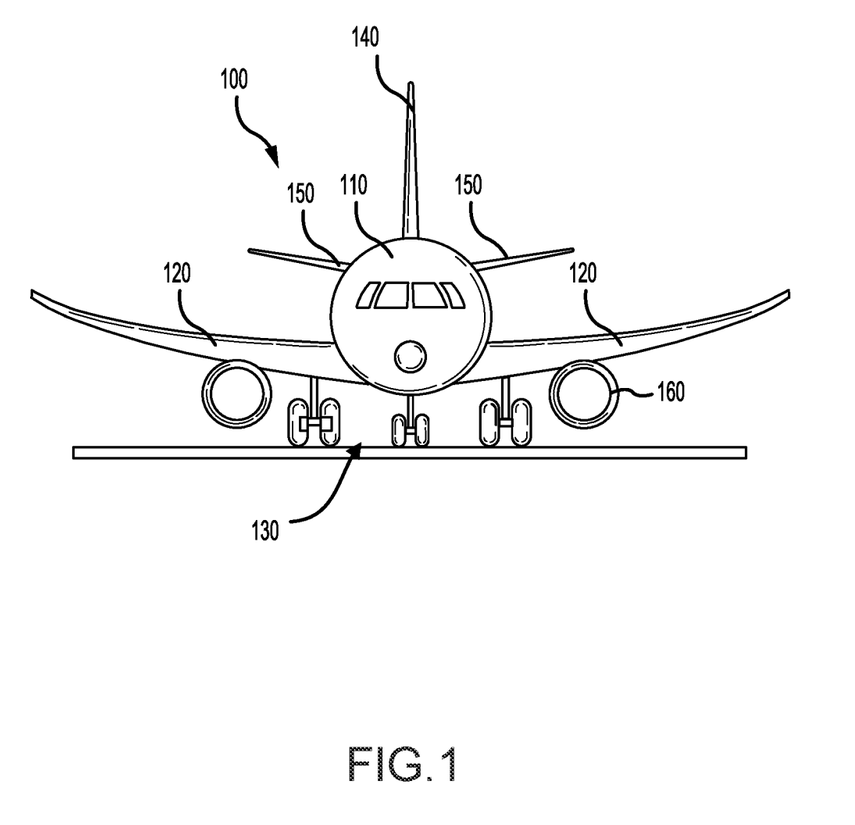
FIG. 1 illustrates a front view of an aircraft, in accordance with various embodiments.

Referring now to FIG. 1, front view of an aircraft 100 is illustrated in accordance with various embodiments. The aircraft 100 comprises a fuselage 110, wings 120 extending outward from the fuselage 110, a landing gear system 130, a vertical stabilizer 140, horizontal stabilizers 150 and engines 160. In various embodiments, fuselage 110 defines an aircraft cabin therein. In this regard, passengers may board the aircraft 100 and sit within the aircraft cabin during travel. The aircraft cabin includes at least one lavatory disposed therein, as described further herein. Aircraft lavatories may have limited space within the aircraft cabin in order to maximize passenger space and/or limit drag of the aircraft 100 during flight. In this regard, if a multi-sensor system is desired in a lavatory of an aircraft, a robust false detection system and method may be beneficial in accordance with various embodiments. Although described herein with respect to a lavatory of an aircraft, the present disclosure is not limited in this regard. For example, any multi-sensor system with overlapping ranges of detection is within the scope of this disclosure.

Figure 2:
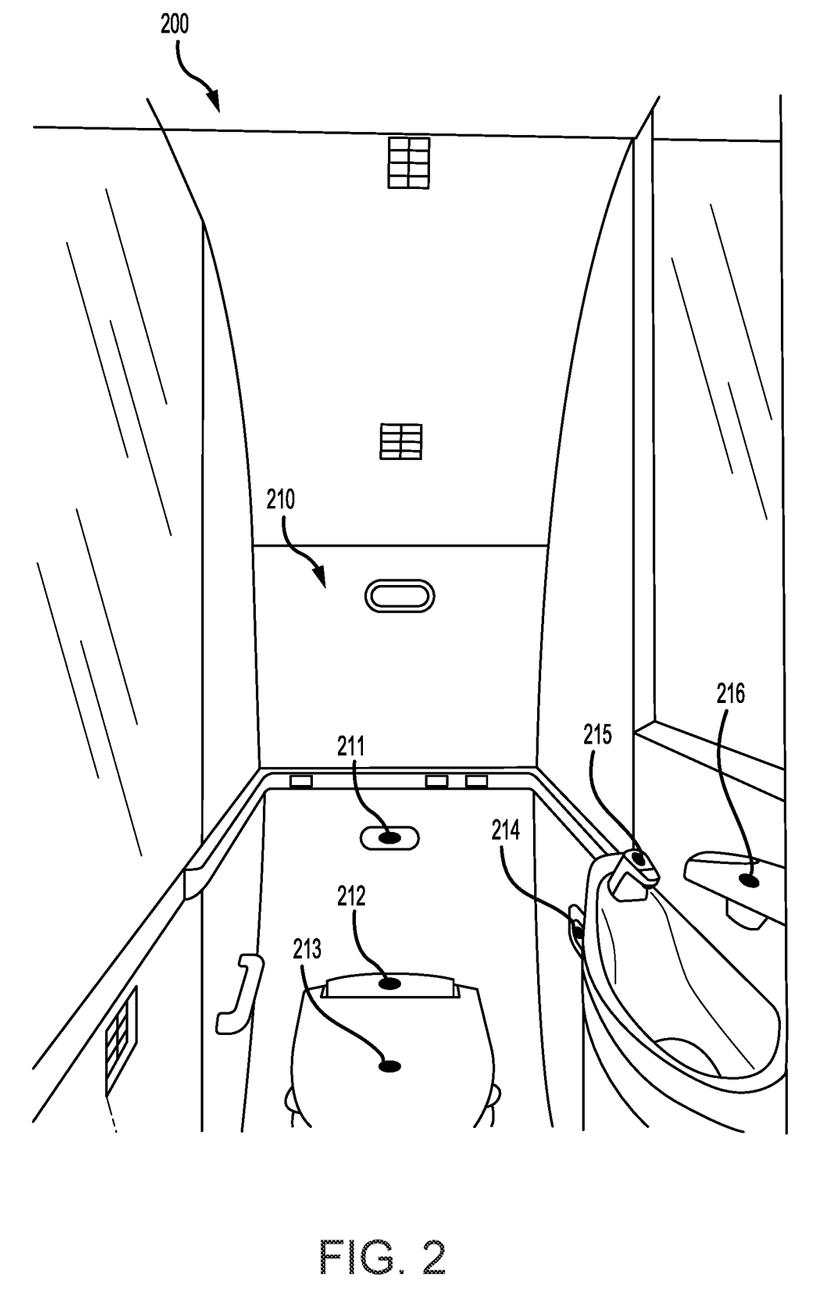
FIG. 2 illustrates a lavatory of an aircraft, in accordance with various embodiments.

Referring now to FIG. 2, a perspective view of a lavatory 200 disposed within a fuselage 110 of the aircraft 100 from FIG. 1, in accordance with various embodiments. The lavatory 200 includes a plurality of sensors 210 (e.g., a sensors 211, 212, 213, 214, 215, 216). In various embodiments, each sensor in the plurality of sensors 210 may comprise near sensing technology, such as infrared sensors, electric field sensors, etc. In various embodiments, in a confined space, such as a lavatory 200 of an aircraft, sensors 210 may be susceptible to false detection by multiple sensors leading to sub optimal use of limited resources on board the aircraft 100 from FIG. 1.

In various embodiments, each sensor in the plurality of sensors 210 may disposed proximate a device which the respective sensor is configured to activate. For example, sensor 211 is disposed proximate a toilet 221 and configured to activate a flush system as described further herein.

Figure 3:
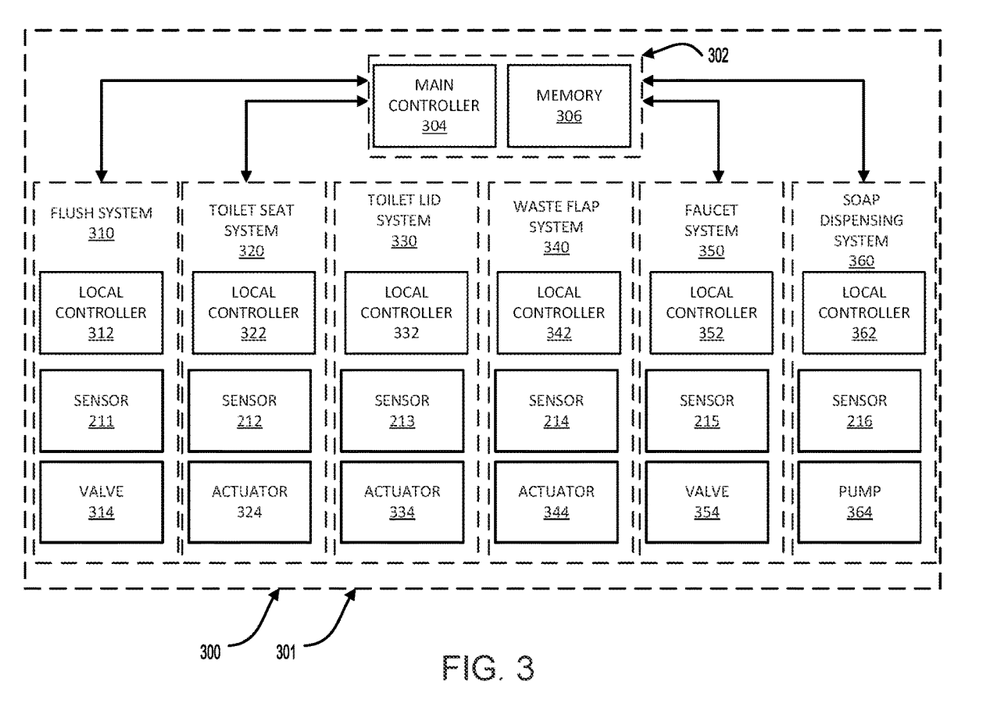
FIG. 3 illustrates a false detection system for a multi-sensor system, in accordance with various embodiments.

Referring now to FIG. 3, a schematic view of a false detection system 301 for a multi-sensor system 300 is illustrated, in accordance with various embodiments. In various embodiments, the false detection system 301 comprises a control system 302 and a plurality of touchless systems (e.g., systems 310, 320, 330, 340, 350, 360). In various embodiments, the plurality of touchless systems may include a flush system 310, a toilet seat system 320, a toilet lid system 330, a waste flap system 340, a faucet system 350, and/or a soap dispensing system 360. Although illustrated as including six touchless systems, the present disclosure is not limited in this regard. For example, the multi-sensor system 300 may be any number of plural sensor (i.e., two or more sensor) and be within the scope of this disclosure.

The control system 302 includes a main controller 304 and a memory 306 (e.g., a database or any appropriate data structure; hereafter "memory 306" also may be referred to as "database 306"). The main controller 304 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., main controller 304 may utilize one or more processors of any appropriate type/ configuration, may utilize any appropriate processing architecture, or both). In various embodiments, the main controller 304 may further include any non-transitory memory known in the art. The memory 306 may store instructions usable by the logic device to perform operations. Any appropriate computer-readable type/configuration may be utilized as the memory 306, any appropriate data storage architecture may be utilized by the memory 306, or both.

The database 306 may be integral to the control system 302 or may be located remote from the control system 302. The main controller 304 may communicate with the database 306 via any wired or wireless protocol. In that regard, the main controller 304 may access data stored in the database 306. In various embodiments, the main controller 304 may be integrated into computer systems onboard the aircraft 100 from FIG. 1. Furthermore, any number of conventional techniques for electronics configuration, signal processing and/or control, data processing and the like may be employed. Also, the processes, functions, and instructions may include software routines in conjunction with processors, etc.

System program instructions and/or controller instructions may be loaded onto a non-transitory, tangible computer-readable medium having instructions stored thereon that, in response to execution by the processor, cause the controller 102 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the control system 302 is in operable communication with each system in the plurality of touchless systems (e.g., systems 310, 320, 330, 340, 350, 360). In various embodiments, each touchless system may comprise a local controller (e.g., local controllers 312, 322, 332, 342, 352, 362). Although described herein as each touchless system having its own local controller, the present disclosure is not limited in this regard. For examples, any of the sensors disclosed herein (e.g., sensors 211, 212, 213, 214, 215, 216) may be in direct communication with the main controller 304 of the control system 302, in accordance with various embodiments.

In various embodiments, each local controller may be in accordance with the main controller 304. For example, each local controller (e.g., local controllers 312, 322, 332, 342, 352, 362) may include one or more logic devices such as one or more of a central processing unit (CPU), an accelerated processing unit (APU), a digital signal processor (DSP), a field programmable gate array (FPGA), an application specific integrated circuit (ASIC), or the like (e.g., local controllers 312, 322, 332, 342, 352, 362 may utilize one or more processors of any appropriate type/configuration, may utilize any appropriate processing architecture, or both). In various embodiments, the local controllers 312, 322, 332, 342, 352, 362 may each further include any non-transitory memory known in the art. The memory may store instructions usable by the logic device to perform operations. Any appropriate computer-readable type/configuration may be utilized as the memory, any appropriate data storage architecture may be utilized by the memory, or both. As described further herein, the main controller 304 may receive inputs from local controllers 312, 322, 332, 342, 352, 362 and send instructions to the local controllers 312, 322, 332, 342, 352, 362.

In various embodiments, each touchless system further comprises and electrically activated device (e.g., valves 314, 354, actuators 324, 334, 344, or a pump 364) and a sensor (e.g., sensors 211, 212, 213, 214, 215, 216). In various embodiments, each sensor (e.g., sensors 211, 212, 213, 214, 215, 216) is a presence sensor. "Presence sensors" as disclosed herein are configured to sense a presence of an object, as opposed to movement of an object. Thus, "presence sensors" as disclosed herein are not primarily used for motion detection. Thus, each sensor disclosed herein may include a transmitter and receiver. For example, when detecting the presence of an object a sensor disclosed herein (e.g., sensors 211, 212, 213, 214, 215, 216) may transmit a signal (e.g., an active infrared signal) towards the object, the signal bounces off the object, and the signal returns to the receiver. In various embodiments, time of flight may be used by a local controller to determine a time of flight and/or calculate a doppler rate of the object, as described further herein.

In various embodiments, each local controller (e.g., local controllers 312, 322, 332, 342, 352, 362) is configured to operate the respective electrically activated device (e.g., valves 314, 354, actuators 324, 334, 344, or a pump 364) in response to a respective sensor (e.g., sensors 211, 212, 213, 214, 215, 216) detecting a presence of an object (e.g., a hand, a foot, or the like). For example, valve 314 of the flush system 310 may be activated in response to the local controller 312 receiving, via a processor and through the sensor 211 an indication that the presence of an object is detected. In various embodiments, the local controller (e.g., local controllers 312, 322, 332, 342, 352, 362) may send a signal to main controller in response to the object being detected. In this regard, the main controller 304 may determine whether multiple sensors (e.g., sensors 211, 212, 213, 214, 215, 216) are detecting the object simultaneously. In response to main controller 304 receiving indications that multiple sensors are detecting objects simultaneously, the main controller 304 may be configured to determine an intended sensor to be activated from the plurality of sensors, as described further herein with respect to method 400 from FIG. 4.

Figure 4:
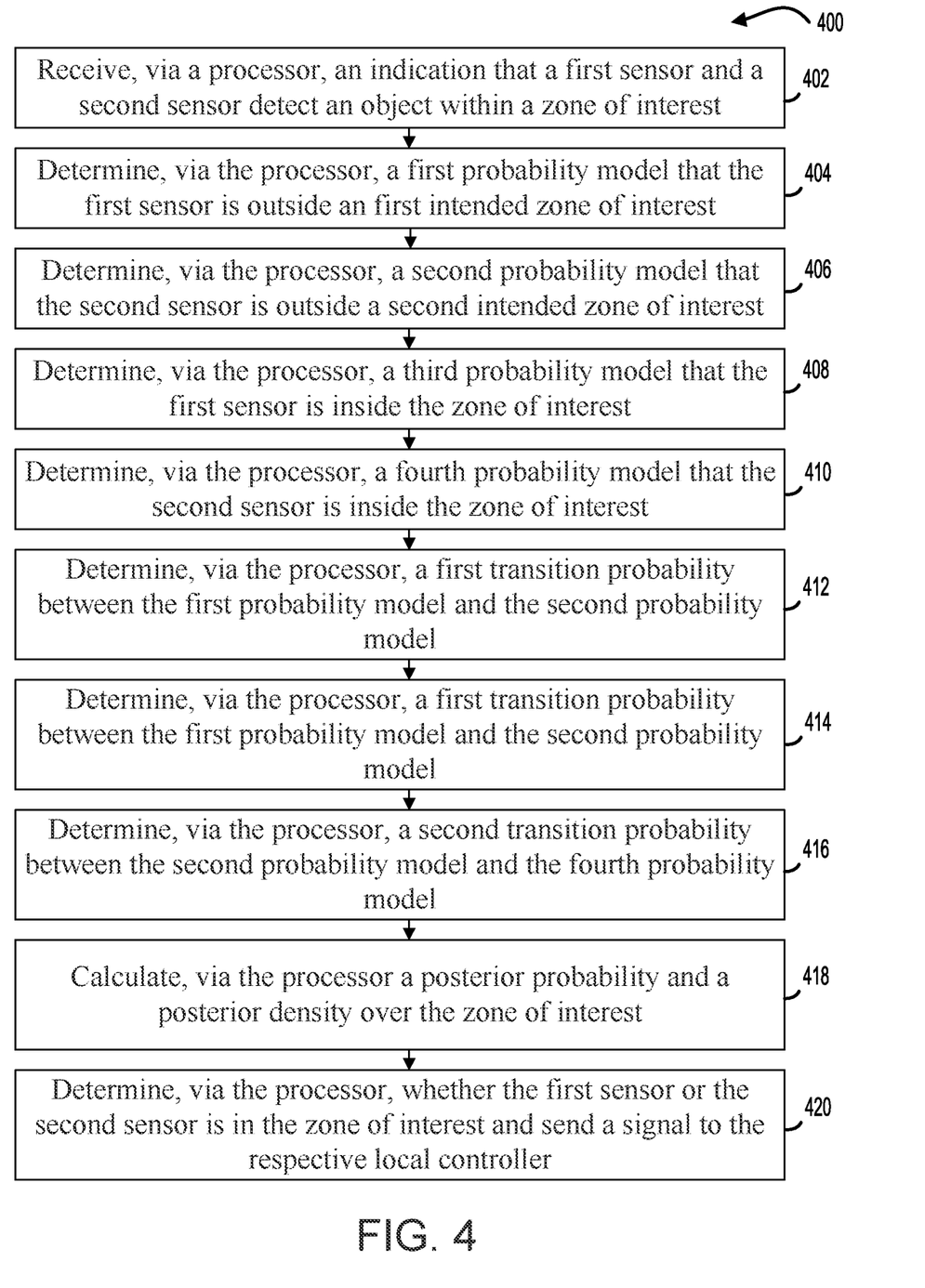
FIG. 4 illustrates a method of operating a false detection system, in accordance with various embodiments.

Referring now to FIG. 4, a flow chart for false detection in a multi-sensor system 300 from FIG. 3 is illustrated, in accordance with various embodiments. In various embodiments, the method 400 comprises receiving, via a process, an indication that a first sensor and a second sensor detect an object within a zone of interest (step 402). The zone of interest may correspond to zone of detection for a respective sensor in the plurality of sensors disclosed previously herein (e.g., sensors 211, 212, 213, 214, 215, 216).

The method further comprises determining, via the processor, a first probability model that the first sensor is outside the zone of interest (step 404) and determining via the processor a third probability model that the second sensor is outsize the zone of interest (step 408). In various embodiments, the first probability model and the third probability model may correspond to a null hypothesis.

In various embodiments, modeling of sensors, noise, and target motion are essential to method 400. In various embodiments, a millimeter wave length sensor (i.e., a band of spectrum of wavelengths between 10 mm and 1 mm, also known as a "mmWave" sensor) may include a transmitter of a sensor emitting a mmWave chirp waveform and a receiver of the sensor using Doppler or other techniques to determine objects in a field of view. The range-Doppler radar may not be additive Gaussian as in other types of sensors and may be non-linear, non-Gaussian, in accordance with various embodiments. In this regard, Kalman filtering would not be applicable or available due to Kalman filtering assumption of linear and/or Gaussian motion models. In various embodiments, the processor may model a noise amplitude based on the following equation:

$$f(y_i \mid x) = \frac{y_i}{2\pi\sigma_n^2}\exp\left(\frac{-(y_i^2 + A_i^2(x))}{2\sigma_n^2}\right)\int_{-\pi}^{\pi}\exp\left(\frac{A_i(x)y_i\sin(\theta)}{\sigma_n^2}\right)d\theta \qquad (eq.\ 1)$$

wherein, $y_i$ is a measured pixel intensity from the sensor at an iteration i;

x is a parametrized state within a zone of interest;

$\sigma$ is a standard deviation of n iterations; and $A_i$ is an image pixel intensity in an absence of noise from the sensor at an iteration i.

Similarly, other motions may be modeled. For example, a model velocity and uniform process noise may be modeled as follows:

$$v^k = v^{k-1} + U_v^k \qquad (eq.\ 2)$$

In various embodiments, the noise model is not limited in this regard. For example, a Gaussian motion model may be utilized in accordance with various embodiments.

In various embodiments, modeling various probabilities, in accordance with steps 404-418 of method 400 may combine sensor models and motion models into sequentially estimating a probability of existence target over a zone of influence. First, two hypothesis may be developed: (1) a null hypothesis, $H_0$, may correspond to the object being outside the zone of interest; and (2) an alternative hypothesis may be that the object exists in a zone of interest parameterized at a state x.

In various embodiments, method 400 determines a probability of existence of an object outside of the zone of interest from steps 404 and 408 by calculating the first probability model and the third probability model in accordance with $P(H_{0|y_0})$. Similarly, the method 400 determines a probability of existence of the object inside of the zone of interest in steps 406 and 410 for the first sensor and the second sensor respectively based on a distribution of the object probability over a state space by a density function $f(x_{0|y_0})$. Here, the density function is non-negative and integrates over the state space due to complement hypothesis $H_0$.

In various embodiments, each probability model may be completed by identifying a transition probability between the two hypothesis for each respective sensor (steps 414, 416). In this regard, at each respective time step, the object can transition from $H_0$ into the state space with probability $\delta_1$ and can vanish from the state space into $H_0$ with probability $\delta_0$.

In various embodiments, the method 400 further comprises calculating a posterior probability $P(H_{0_k|y_{1:k}})$ and a posterior density $f(x_{k|y_{1:k}})$ over the state recursively using a combination of prediction and updating the steps over time. In various embodiments, the posterior probability is the probability of the null hypothesis occurring given that the measured pixel magnitude over time iterations, $y_{i:k}$ occurred. In various embodiments, the posterior density of parametrized state x at time iteration k given the measured pixel intensity from a first time iteration to the kth time iteration. In various embodiments, the posterior probability is the revised or updated probability of an event occurring (e.g., of the object intending to be in the sensor's zone of interest). In various embodiments, the posterior probability is calculated by updating the prior probability.

In various embodiments, based on steps 404-418, the processor of the main controller 304 from FIG. 3 may determine whether the first sensor or the second sensor is within a respective intended zone of interest and send a signal to the respective local controller (step 420). In this regard, in response to the processor determining the first sensor is detecting the object in the first sensor's intended zone of interest and the second sensor detecting the object outside the second sensor's intended zone of interest, a local controller for the first sensor may send a signal to a respective electrically activated device as disclosed previously herein.

Figure 5:
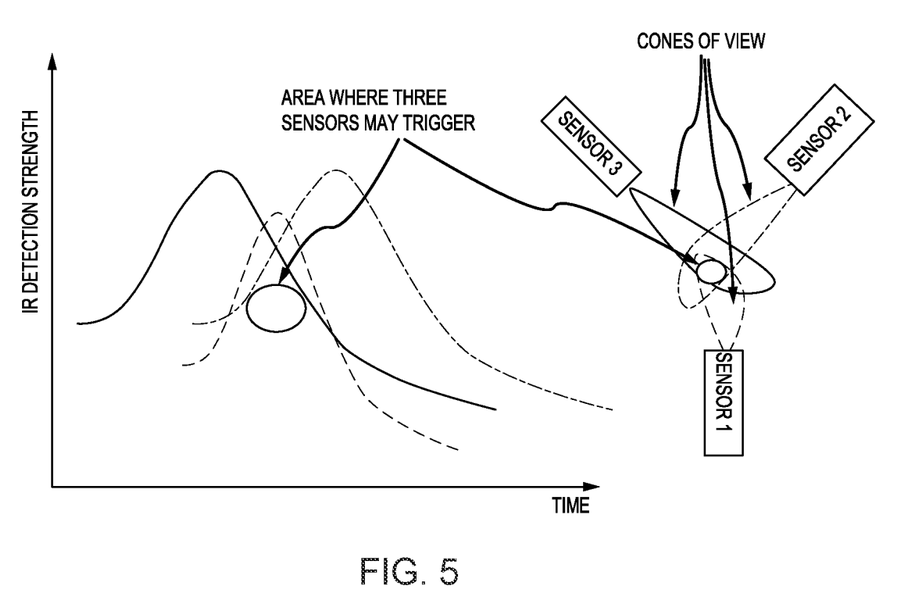
FIG. 5 illustrates overlapping ranges of a plurality of sensors in a multi-sensor system, in accordance with various embodiments.

Referring now to FIG. 5, an illustration of overlapping zones of interest for sensors is illustrated in accordance with various embodiments. As illustrated, an area exists where the three sensors illustrated all overlap. In various embodiments, the method 400 may be utilized to determine whether an object is in an intended zone of interest for a sensor in response to multiple sensors detecting the object within their respective zones of interest as described previously herein.

In various embodiments, the methods and systems disclosed herein may reduce false activation of sensor and/or improve discrimination between sensors ensuring correct operation of different components in an aircraft lavatory (e.g., lavatory 200 from FIG. 2). In various embodiments, precious resources on an aircraft 100 from FIG. 1, such as water, may be maintained throughout flight based on the methods and systems disclosed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of determining whether an object is in an intended zone of influence, the method comprising,
    receiving, via a processor and through a first sensor, a first indication that the object is within a first zone of interest;
    receiving, via the processor and through a second sensor, a second indication that the object is within a second zone of interest;
    determining a first null hypothesis corresponding to the object being outside a first intended zone of interest of the first sensor;
    determining a second null hypothesis corresponding to the object being outside a second intended zone of interest of the second sensor;
    determining a first alternative hypothesis corresponding to the object being inside the first intended zone of interest;
    determining a second alternative hypothesis corresponding to the object being inside the second intended zone of interest;
    calculating, via the processor, a posterior probability and a posterior density over the first zone of interest and the second zone of interest; and
    determining, via the processor, whether the object is within the first intended zone of interest or the second intended zone of interest.

2. The method of claim 1, further comprising commanding, via the processor, an electrically activated device associated with the first sensor in response to determining the object is within the first intended zone of interest.

3. The method of claim 1, wherein the first null hypothesis corresponds to a first probability model and the second null hypothesis corresponds to a second probability model.

4. The method of claim 3 wherein the first probability model and the second probability model are given by $P(H_{0|y_0})$, wherein $H_0$ is a null hypothesis and y is a measured pixel intensity from a respective sensor.

5. The method of claim 4, wherein the first alternative hypothesis corresponds to a third probability model and the second alternative hypothesis corresponds to a fourth probability model.

6. The method of claim 5, wherein the first alternative hypothesis and the second alternative hypothesis are given by $f(x_{0|y_0})$, wherein x is a parametrized state.

7. The method of claim 1, wherein the first sensor and the second sensor are presence sensors.

8. The method of claim 1, wherein the first sensor and the second sensor are infrared sensors.

9. A false detection system for a multi-sensor system, comprising:
    a plurality of sensors, each sensor including a zone of interest;
    a main controller in operable communication with the plurality of sensors the main controller configured to:
        receive, via a processor, a first indication that an object is in a first zone of interest of a first sensor in the plurality of sensors;
        receive, via the processor, a second indication that the object is in a second zone of interest of a second sensor in the plurality of sensors;
        determine, via the processor, a null hypothesis that the object is within a respective intended zone of interest
        determine an alternative hypothesis that the object is outside the respective intended zone of interest; and
        determine, via the processor, whether the first sensor or the second sensor is falsely detecting the object within the respective zone of interest based on the null hypothesis and the alternative hypothesis.

10. The false detection system of claim 9, wherein the main controller is further configured to determine whether the first sensor or the second sensor is within an intended zone of interest of the respective sensor.

11. The false detection system of claim 10, wherein the main controller is further configured to send, via the processor and through a local controller, a signal to an electrically activated device corresponding to the first sensor in response to determining the first sensor is within the intended zone of interest.

12. The false detection system of claim 9, wherein the first sensor and the second sensor are configured for detection of non-linear and non-Gaussian motion.

13. The false detection system of claim 9, wherein the first sensor and the second sensor are presence sensors.

14. An aircraft lavatory, comprising:
    a first sensor;
    a second sensor;
    a first electrically activated device;
    a second electrically activated device;
    a first local controller in operable communication with the first sensor and the first electrically activated device;
    a second local controller in operable communication with the second sensor and the second electrically activated device; and
    a main controller in operable communication with the first local controller and the second local controller, the main controller configured to determine whether an object is intended to activate the first electrically activated device or the second electrically activated device in response to the object being disposed in overlapping ranges of the first sensor and the second sensor.

15. The aircraft lavatory of claim 14, wherein the main controller is further configured to command, through the first local controller, the first electrically activated device to operate in response to determining the object is intended for to operate the first electrically activated device.

16. The aircraft lavatory of claim 15, wherein the first electrically activated device is a valve of a faucet system.

17. The aircraft lavatory of claim 15, wherein the first electrically activated device is an actuator of a toilet seat system.

18. The aircraft lavatory of claim 15, wherein the first electrically activated device is a pump of a soap dispensing system.

19. The aircraft lavatory of claim 14, further comprising a faucet system including the first sensor, the first electrically activated device, and the first local controller.

\* \* \* \* \*

UNITED STATES PATENT AND TRADEMARK OFFICE
CERTIFICATE OF CORRECTION

| | | |
|---|---|---|
| PATENT NO. | : 11,952,121 B2 | |
| APPLICATION NO. | : 17/350965 | |
| DATED | : April 9, 2024 | |
| INVENTOR(S) | : Sanjay Bajekal | |

It is certified that error appears in the above-identified patent and that said Letters Patent is hereby corrected as shown below:

In the Claims

Claim 9, at Column 10, Line 29 please insert --;-- after the word "interest"

Signed and Sealed this
Sixth Day of August, 2024

Katherine Kelly Vidal
*Director of the United States Patent and Trademark Office*